US010757325B2

(12) United States Patent
Rogers et al.

(10) Patent No.: US 10,757,325 B2
(45) Date of Patent: Aug. 25, 2020

(54) HEAD-MOUNTABLE DISPLAY SYSTEM

(71) Applicant: Sony Interactive Entertainment Inc., Tokyo (JP)

(72) Inventors: Phillip Rogers, London (GB); Quoc Dat Nguyen, London (GB); Rohan Pankaj Bangdiwala, London (GB); David Peter Woodhouse, London (GB); Anthony Godar, London (GB)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/767,326

(22) PCT Filed: Oct. 14, 2016

(86) PCT No.: PCT/GB2016/053188
§ 371 (c)(1),
(2) Date: Apr. 10, 2018

(87) PCT Pub. No.: WO2017/064502
PCT Pub. Date: Apr. 20, 2017

(65) Prior Publication Data
US 2018/0302557 A1 Oct. 18, 2018

(30) Foreign Application Priority Data
Oct. 14, 2015 (GB) .................................. 1518210.8

(51) Int. Cl.
*H04N 5/232* (2006.01)
*H04N 19/46* (2014.01)
(Continued)

(52) U.S. Cl.
CPC ....... *H04N 5/23238* (2013.01); *H04N 19/146* (2014.11); *H04N 19/154* (2014.11); *H04N 19/46* (2014.11); *H04N 21/23439* (2013.01)

(58) Field of Classification Search
CPC ............. H04N 5/23238; H04N 19/146; H04N 19/154; H04N 19/46
See application file for complete search history.

(56) References Cited

U.S. PATENT DOCUMENTS

2004/0086186 A1  5/2004 Kyusojin
2006/0034367 A1  2/2006 Park
(Continued)

FOREIGN PATENT DOCUMENTS

CN   104735464 A   6/2015
EP   1162830 A2   12/2001
(Continued)

OTHER PUBLICATIONS

International Search Report and Written Opinion for corresponding PCT Application No. PCT/GB2016/053188, 27 pages, dated Feb. 20, 2017.
Parkhurst D et al: "Variable-Resolution Displays: A theoretical. practical and behavioral evaluation". Human Factors. Human Factors and Ergonomics Society. Santa Monica. CA. vol. 44. No. 4., 19 pages, Jan. 1, 2002.
(Continued)

*Primary Examiner* — Mishawn N. Hunter
(74) *Attorney, Agent, or Firm* — Matthew B. Dernier, Esq.

(57) ABSTRACT

A video server comprises a video encoder to encode video data representing panoramic video content in which the panoramic video content has a greater field of view than a displayable region at a client device, the video encoder being configured to encode spatial regions within the video content at different respective encoding qualities in dependence upon track data indicating, for temporal positions with respect to the panoramic video content, a preferred viewing region within the panoramic video content at those temporal positions, so that the preferred viewing region is encoded at a higher encoding quality than another region of the panoramic video content.

21 Claims, 10 Drawing Sheets

(51) Int. Cl.
*H04N 19/146* (2014.01)
*H04N 19/154* (2014.01)
*H04N 21/2343* (2011.01)

(56) References Cited

U.S. PATENT DOCUMENTS

| | | | |
|---|---|---|---|
| 2015/0077416 | A1 | 3/2015 | Villmer |
| 2015/0100703 | A1 | 4/2015 | Begen |
| 2015/0163473 | A1* | 6/2015 | Osawa ............... H04N 13/221 348/53 |
| 2016/0012855 | A1* | 1/2016 | Krishnan ........... H04N 21/4728 386/241 |
| 2016/0080830 | A1* | 3/2016 | Kim .................... H04N 21/485 725/19 |
| 2016/0228771 | A1* | 8/2016 | Watson .................. G06F 3/013 |
| 2016/0246061 | A1* | 8/2016 | Bickerstaff ............. G06F 3/012 |
| 2017/0092002 | A1* | 3/2017 | Mullins ................... G06F 3/013 |
| 2017/0094278 | A1* | 3/2017 | Bickerstaff ............. G06T 5/006 |
| 2017/0249745 | A1* | 8/2017 | Fiala ....................... G06T 7/246 |

FOREIGN PATENT DOCUMENTS

| | | |
|---|---|---|
| GB | 2505912 A | 3/2014 |
| GB | 2523740 A | 9/2015 |

OTHER PUBLICATIONS

Kimber D et al: "FlyAbout: spatially indexed panoramic video" Proceedings / ACM Multimedia 2001. [9th ACM International Conference on Multimedia]: Ottawa. Canada. Sep. 30 Oct. 5, 2001. Assoc. For Computing Machinery. New York. NY. USA. vol. CONF. 9., 9 pages, Sep. 30, 2001.

Thi Phuong Nghiem: "Enhancing the Use of Online 3D Multimedia Content Through the Analysis of User Interactions." Retrieved from the Internet: URL:http://ethesis.inp-toulouse.fr/archive/00002722/01/nghiem.pdf [retrieved on Apr. 20, 2016]Section 3.2.3 11 Monitoring User Interactions p. 37-p. 38 Section 2.3.3. "Interaction Techniques" p. 22, 108 pages total (Jul. 2014).

Search Report for corresponding GB Application No. GB1518210. 8, 5 pages, dated Mar. 2, 2016.

Communication pursuant to Article 94(3) EPC for corresponding EP Application No. 16784257.4, 6 pages, dated Apr. 1, 2019.

Examination Report for corresponding GB Application No. GB1518210. 8, 2 pages, dated Dec. 20, 2019.

EP Communication pursuant to Article 93(3) for corresponding EP Application No. 16784257.4, 6 pages, dated Jun. 29, 2020.

Aditya Mavlankar, et al., "An Interactive region-of-interest video streaming system for online lecture viewing" Packet Video Workshop, Proceedings of 2010 IEEE, 18th International, pp. 64-71, Dec. 13, 2010.

* cited by examiner

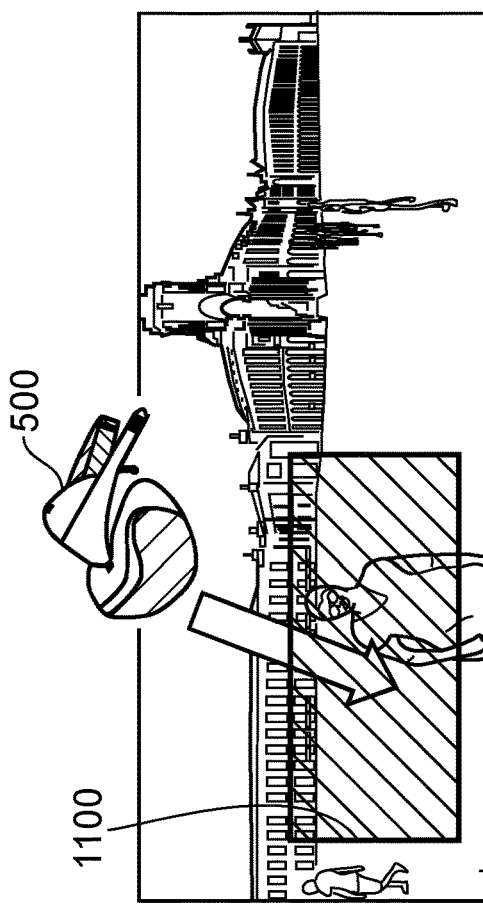

HEAD-MOUNTABLE DISPLAY SYSTEM

BACKGROUND

Field of the Disclosure

This disclosure relates to head-mountable display systems.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus. In an HMD, an image or video display device is provided which may be worn on the head or as part of a helmet. Either one eye or both eyes are provided with small electronic display devices.

Although the original development of HMDs was perhaps driven by the military and professional applications of these devices, HMDs are becoming more popular for use by casual users in, for example, computer game or domestic computing applications.

HMDs can be used to view panoramic video content, for example content which extends beyond the displayable limits or region of the HMD. An orientation detection of the current orientation of the HMD can be used to select an appropriate portion of the panoramic content for viewing.

Panoramic content can require a large amount of data to be streamed. But the HMD is viewing only a portion of the content at any time.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a video server, a head mountable display, a system, a method of operating a video server or a head-mountable apparatus as well as a computer program and a video signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 20a-20c schematically illustrate a video encoding and display technique.

DESCRIPTION OF THE EMBODIMENTS

Figure 1:
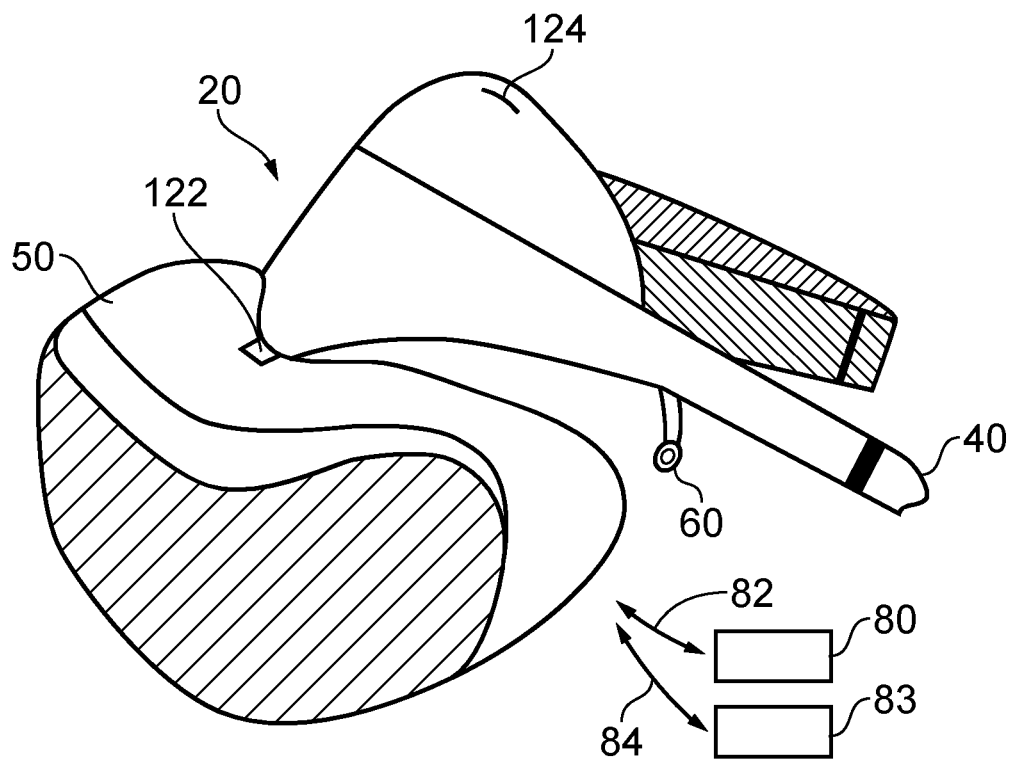
FIG. 1 schematically illustrates an HMD to be worn by a user.

Referring now to FIG. 1, an HMD 20 (as an example of a generic head-mountable apparatus) is wearable by a user. The HMD comprises a frame 40, in this example formed of a rear strap and an upper strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, one image for each eye.

The HMD has associated headphone audio transducers or earpieces 60 which fit into the user's left and right ears. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. The external apparatus could communicate with a video server. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling or diverting down behind the ear. In other (not full immersion) examples, the user's view of the external environment may not in fact be entirely obscured; the displayed images could be arranged so as to be superposed (from the user's point of view) over the external environment.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. These can cooperate to display three dimensional or two dimensional content.

In some situations, an HMD may be used simply to view movies, or other video content or the like. If the video content is panoramic (which, for the purposes of this description, means that the video content extends beyond the displayable area of the HMD so that the viewer can, at any time, see only a portion but not all of the video content), or in other uses such as those associated with virtual reality (VR) or augmented reality (AR) systems, the user's viewpoint needs to track movements with respect to a real or virtual space in which the user is located. Arrangements to achieve this will be discussed with reference to FIGS. 5, 6a and 6b.

Figure 3:
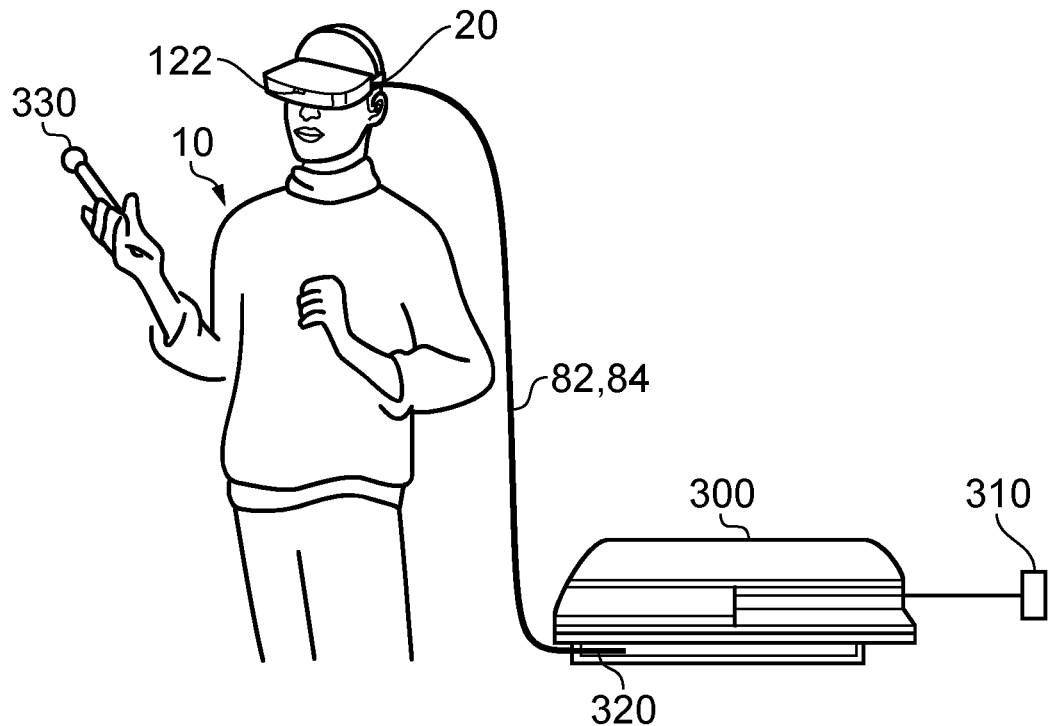
FIGS. 3 and 4 schematically illustrate a user wearing an HMD connected to a Sony® PlayStation® games console.

FIG. 3 schematically illustrates a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 3, the user is also shown holding a hand-held controller 330 which may be, for example, a Sony® Move® controller which communicates wirelessly with the games console 300 to control (or to contribute to the control of) operations relating to a currently executed program at the games console.

The video displays in the HMD 20 are arranged to display images provided via the games console 300, and the earpieces 60 in the HMD 20 are arranged to reproduce audio signals generated by the games console 300. The games console may be in communication with a video server. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 4:
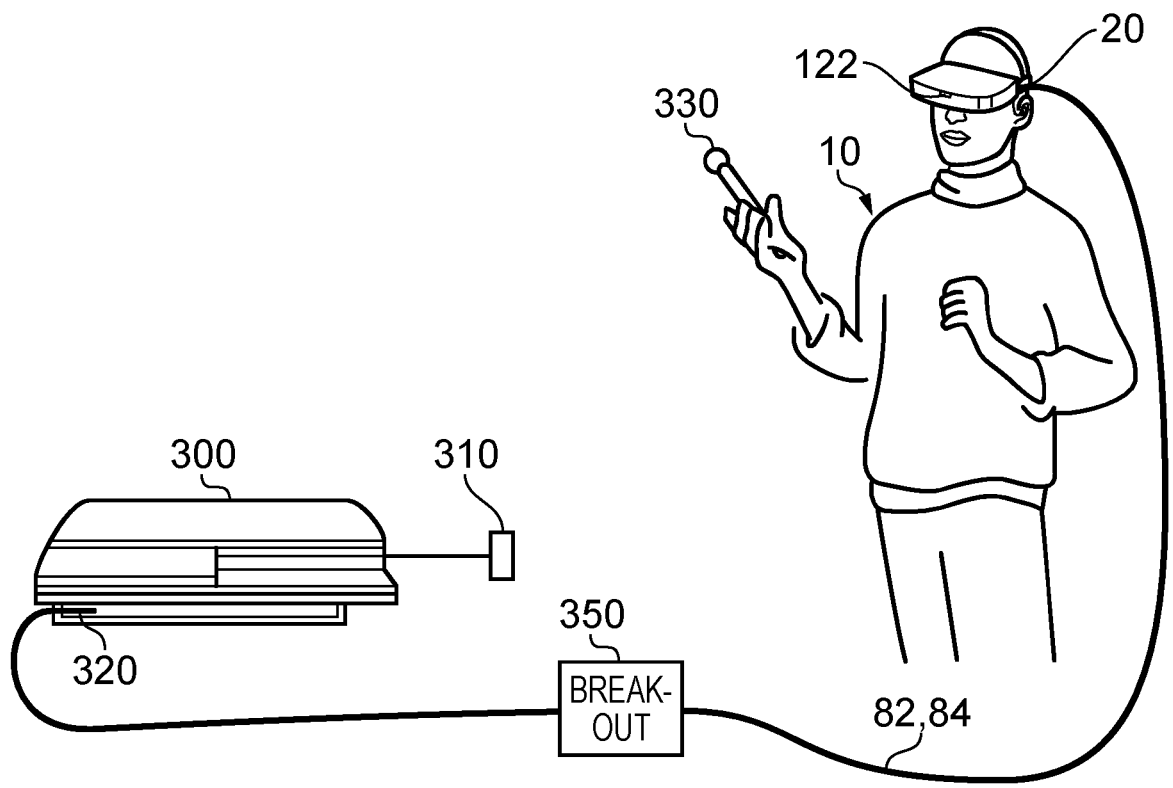

FIG. 4 schematically illustrates a similar arrangement in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source (for example, sensor) signals, on which the processing is to take place, could be distributed to another device, or the processing results from the processing of those source signals could be sent to another device, as required. So any references to processing taking place at a particular device should be understood in this context.

As mentioned above, in some uses of the HMD, such as those associated with panoramic video content viewing, virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 5:
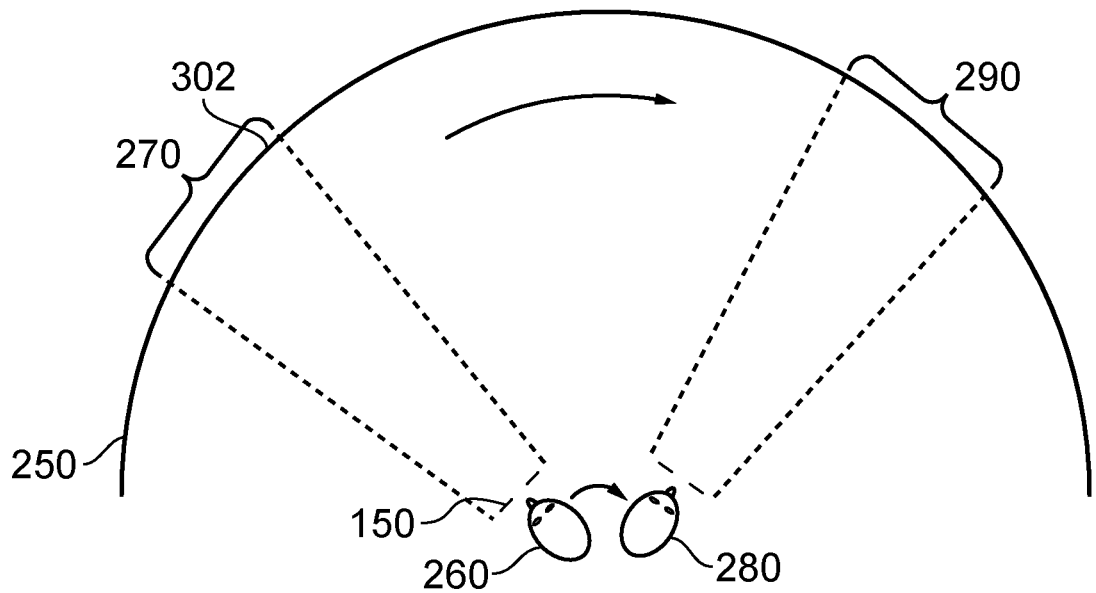
FIG. 5 schematically illustrates a change of view of user of an HMD.

FIG. 5 schematically illustrates the effect of a user head movement in a VR or AR system.

Referring to FIG. 5, a virtual environment is represented by a (virtual) spherical or cylindrical or part-spherical shell 250 around a user. This provides an example of a virtual display screen. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It will be appreciated that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 of content is displayed by the HMD.

So, in this arrangement, the apparent viewpoint within the virtual environment moves with the head movement. If the head rotates to the right side, for example, as shown in FIG. 5, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

A detection of how the user moves his head while wearing the HMD, and therefore a detection of which is a current portion (such as 270, 290) of content to be displayed, can be carried out using one or more motion sensors.

Note that, using established audio processing techniques, a so-called 3D audio field can be created for the user by the earpieces 60. In this arrangement the direction in which the HMD wearer perceives sound to be coming from can be controlled by processing applied to the signals being emitted by the two earpieces 60. The panoramic video may have an associated sound field such that sounds are assigned to particular directions with respect to the underlying video content. As the user turns his head, the 3D sound field is varied (for example, by a processor at the HMD) so that the sounds remain aligned with the correct portion of the displayed video content whatever the viewer's head direction. So, for example, if the viewer has his back to the main action in a piece of panoramic video content, the sound corresponding to that main action would be arranged, using the 3D audio field, to be perceived by the viewer to be coming from behind him.

Figure 2:
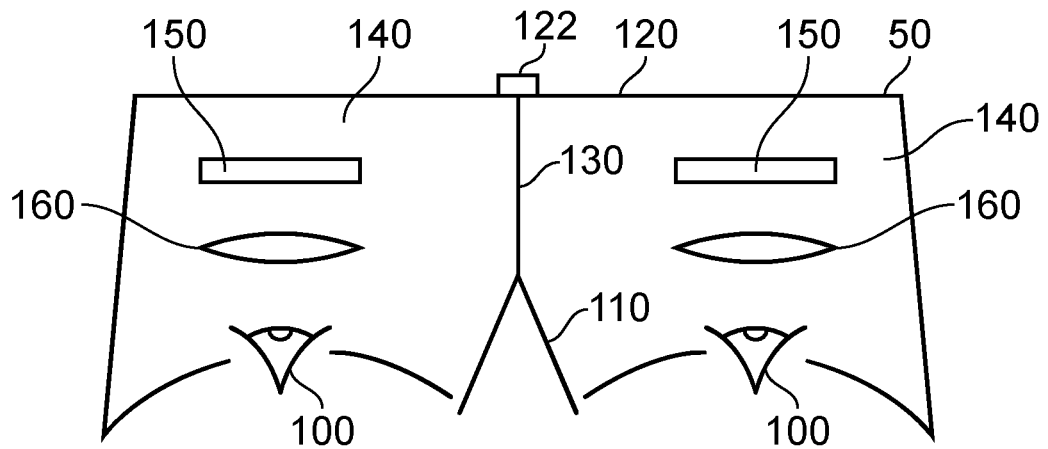
FIG. 2 is a schematic plan view of an HMD.
Figure 6A:
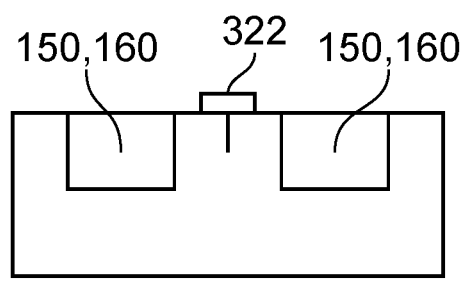
FIGS. 6a and 6b schematically illustrate HMDs with motion sensing.
Figure 6B:
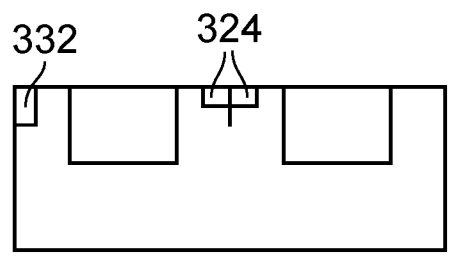

FIGS. 6a and 6b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 6a, a forward-facing camera 322 is provided on the front of the HMD. This may be the same camera as the camera 122 discussed above, or may be an additional camera. This does not necessarily provide images for display to the user (although it could do so, for example in an augmented reality arrangement). Instead, its primary purpose in the present embodiments is to allow motion sensing. A technique for using images captured by the camera 322 for motion sensing may include so-called optical flow detection, in which a motion is detected by detecting differences between successively captured images of the environment surrounding the camera 322. In these arrangements, the motion detector comprises a camera mounted so as to move with the frame; and an image comparator operable to compare successive images captured by the camera so as to detect inter-image motion.

FIG. 6b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

FIG. 6b also shows an example of an eye tracking camera 324 disposed in each of the compartments 140. This can be used (by established techniques) to detect a direction of gaze of the wearer with respect to the currently displayed image, and therefore to detect what the user is looking at within a currently displayed image.

FIGS. 6a and 6b therefore provide examples of a head mountable display (HMD) comprising: a display arrangement; an orientation detector configured to detect an orientation of the HMD; and a video processor configured to generate images for display by the display arrangement in dependence upon the detected current orientation. As discussed below, the video may be panoramic video content sent to the HMD by a video server.

Figure 7:
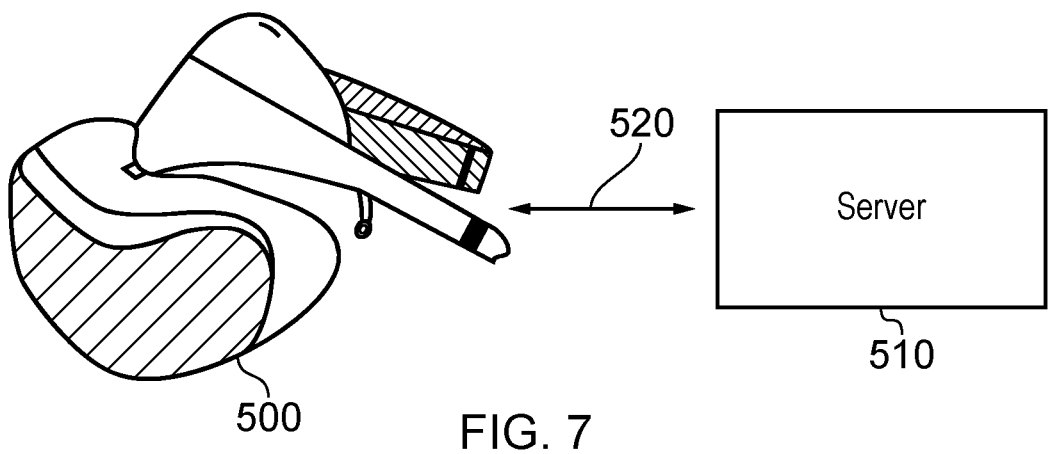
FIG. 7 schematically illustrates an HMD system.

As mentioned above, the HMD can receive video content such as streaming video content for display from a server. FIG. 7 schematically illustrates an HMD system comprising an HMD 500 and a server 510 which are connected or associated together for data transfer by a data connection 520. For the purposes of the present discussion, the HMD 500 may be of the type described as the HMD 50 above. It may include a console or other processing unit such as the console 300 shown in FIGS. 3 and 4, and/or a device such as a breakout box 350 as shown in FIG. 4. Alternatively, the HMD 500 may be a self-contained head-mountable unit capable of communicating with the server without the need for external apparatus. Or, just a battery or power supply may be provided externally to the HMD itself. All of these different options are encompassed within the generic illustration of the HMD 500 in FIG. 7.

The server 510 may be located remotely from the HMD 500, for example at a data centre or even in another country to the HMD 500. The data connection 520 may be, for example, an internet connection and may include wired and/or wireless connections. The HMD 500 (encompassing the various options just described) will be referred to in the discussion that follows as an "HMD client". In this regard, the HMD client is acting as a client of the server 510. Other HMD clients (not shown in FIG. 7) may be associated with the server 510 at the same time as the HMD client 500. In this way, the server 510 can potentially provide video content to multiple HMD clients at the same time. The server 510 is an example of a video server comprising: a video encoder to encode video data representing panoramic video content in which the panoramic video content has a greater field of view than a displayable region at a client device.

Figure 8:
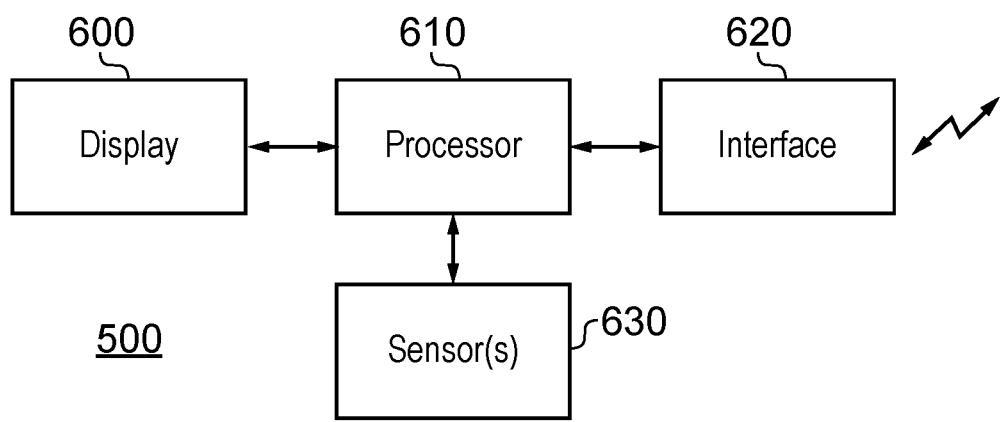
FIG. 8 schematically illustrates an HMD client.

FIG. 8 is a schematic diagram showing functional features of the HMD client 500. The HMD client 500 comprises a display arrangement 600 (for example, embodied as a display portion having a pair of video displays and associated control electronics, of the type discussed above with reference to FIG. 2), a processor 610, an interface 620, for example for communicating with the server 510, and one or more sensors 630. Here, the sensors 630 may be, for example, a motion sensor such as the camera 322 or the accelerometer 332 discussed with reference to FIGS. 6a and 6b, and/or an eye position or gaze direction detector 324, and/or one or more other sensors. The way in which information from the sensors is used will be described below in more detail. as discussed below, the processor 610, the sensors 630 and the interface 620 cooperate to provide an example of a client data transmitter to send data indicative of the detected orientation to the video server.

Figure 9:
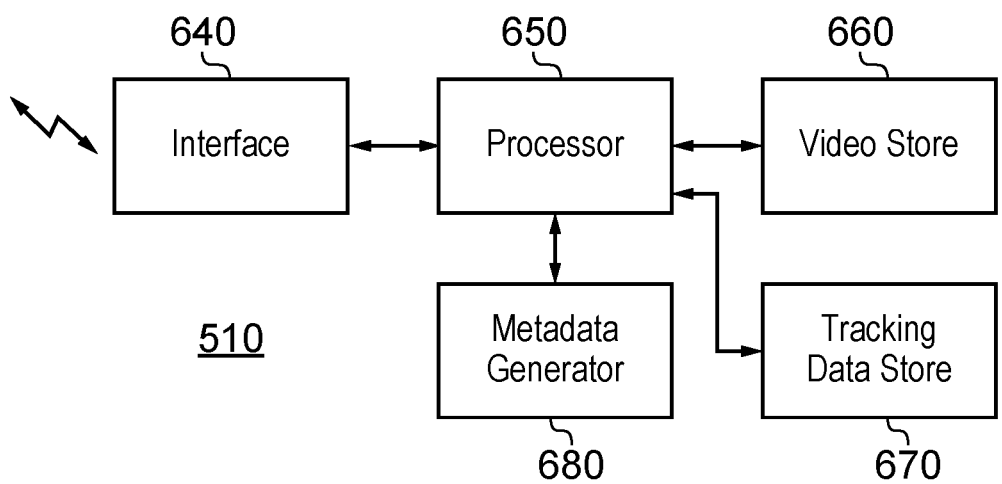
FIG. 9 schematically illustrates a video server.

FIG. 9 schematically illustrates a video server such as the server 510 of FIG. 7. The server 510 comprises a data interface 640, for example for communicating with one or more HMD clients, a processor 650, a video store 660, a tracking data store 670 and a metadata generator 680.

Unless otherwise stated, it should be assumed that operations defined as taking place at either the HMD client or the server are carried out by the respective processor 610, 650 operating under the control of appropriate programming instructions, for example programming instructions provided via the respective interface and/or via a non-transitory machine-readable storage medium which stores such instructions. An example of such a medium is a magnetic or optical disk.

The processor 650, the video store 660 and the interface 640 cooperate to provide an example of a data transmitter to transmit at least encoded video data to one or more client devices.

Example modes of operation of the system of FIG. 7 relate to the transmission of so-called streaming content from the server 510 to the HMD client 500. Here, the term "streaming" implies that the content is sent, at least in part, during the time period of display of the content. So, although a certain amount of content may be buffered at the HMD client to avoid variations in the performance of the data link to the server causing an interruption in content display, in general terms the content is received from the server just before it is needed for display. This contrasts with a so-called download mode of operation, in which the content is received and stored locally for display, before the actual display starts. In the case of downloaded content, a lower bandwidth of data connection between the HMD client and the server would just mean that the download process takes longer; it need not affect the display quality of the content. Although the arrangements of FIG. 7 and the techniques described here can operate in respect of downloaded content (and can improve the storage requirements of the downloaded content), they are particularly applicable to streaming content for which it is relevant to provide encoding efficiency to allow the content to be received via the instantaneous bandwidth of the data connection between the HMD client and the server.

Techniques to be discussed below relate to the transmission and display (by an HMD client) of so-called panoramic video content. Here, the term "panoramic" is used to describe video content such that the content itself extends beyond the displayable region or limits of the HMD device. This in turn means that at any one time, the HMD displays no more than a subset (being less than the whole) of the panoramic video content, in the manner of FIG. 5. An example is so-called "360 degree" video content which is displayable by an HMD such that the user can see any part of the 360 degree content by turning his head (while wearing the HMD) in the appropriate direction, as discussed with reference to FIG. 5 above, and the content VDS extends completely around the viewer. But the present techniques are applicable to panoramic content which does not extend to the full 360 degrees range.

By gathering information on how a cohort of users or viewers actually view the panoramic content, and in particular the HMD orientation (with respect to the video content) during viewing, it is possible to detect the most popular viewing angles as a function of time within the content. This viewing angle information can then be used to encode the panoramic content so as to vary the encoding quality according to viewing angle. So, the encoding efficiency and/or the viewing experience for future viewers can be improved.

For example, content viewable at more popular viewing orientations can be encoded at a higher encoding quality (and a higher localised data rate) than less popular viewing angles. In this way, the entire panoramic content can be transmitted from the server to the HMD client but the overall data requirements can be lower than if the whole content was transmitted at a single consistent data rate and compression quality (or, for the same overall data rate, the regions which are more commonly viewed can be provided at a higher quality). The analysis can be based on those users or viewers who have viewed the content so far such that the accuracy of the analysis of popular viewing angles can increase with an increasing number of previous viewers. In some examples multiple paths or tracks through the video can be detected and separate versions of the content can be encoded according to the different tracks. Such arrangements will be discussed further below.

Therefore, by collecting usage data, for example motion information defining head movements or orientations during viewing of the content, those portions of the panoramic content which typical users view can be encoded at a higher quality, while other (normally unseen) regions can be encoded at a lower quality. This can result in significant overall data bandwidth savings and/or greater efficiencies. This provides an example of a video encoder of the server (implemented, for example, by the processor) being configured to encode spatial regions within the video content at different respective encoding qualities in dependence upon track data indicating, for temporal positions with respect to the panoramic video content, a preferred viewing region within the panoramic video content at those temporal positions, so that the preferred viewing region is encoded at a higher encoding quality than another region of the panoramic video content.

Figure 10:
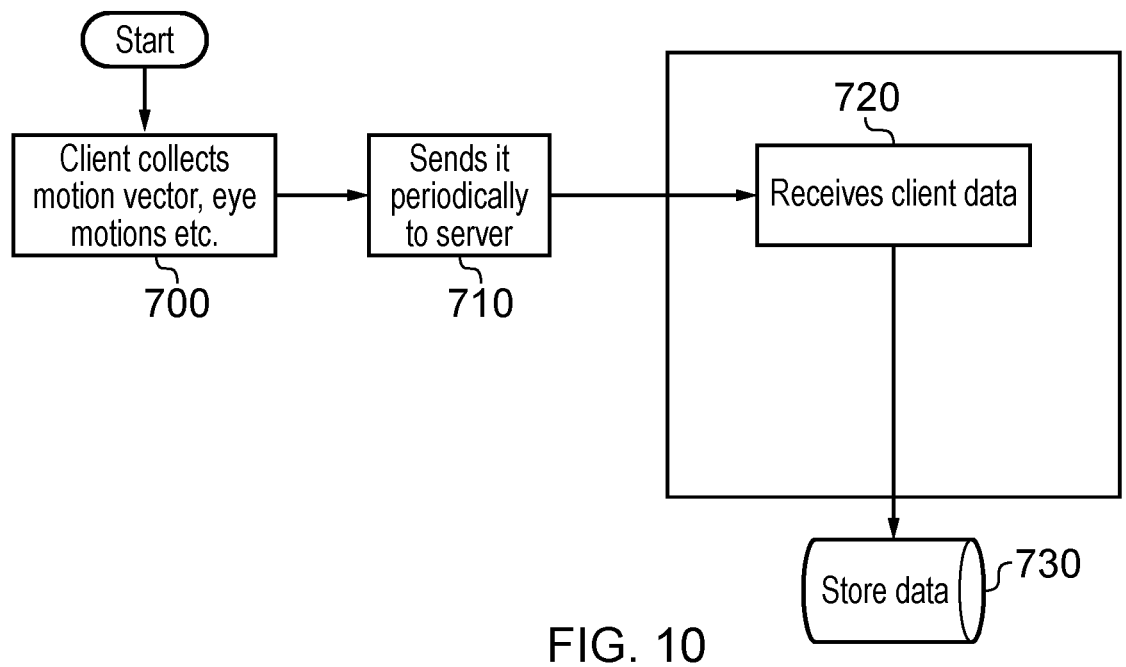
FIG. 10 is a schematic flowchart illustrating operations of an HMD system.

FIG. 10 is a schematic flowchart illustrating some operations of an HMD system such as the system of FIG. 7. These operations relate to the collection of client data, which in this context is data defining detected motion of a client HMD indicative of a viewing direction while particular video content is being viewed.

At a step 700, the client device collects sensor information such as motion information of the whole HMD device, eye motion or gaze tracking information and so on, and at a step 710 the client device sends such information to the server. The step 710 can be carried out periodically (for example, every 3-5 seconds, or at the termination of viewing of a particular content item, or at another frequency or occurrence or set of instances).

The server receives the data from the client device at a step 720 and stores it in the tracking data store 670 at a step 730.

Figure 11:
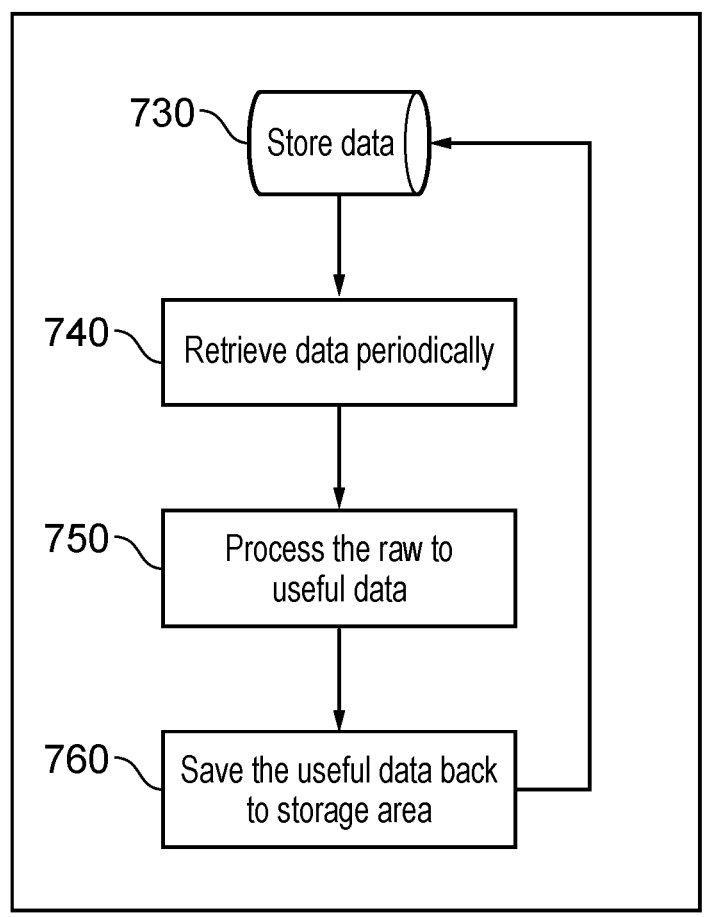
FIG. 11 is a schematic flowchart illustrating operations of a video server.

FIG. 11 is a schematic flowchart illustrating operations of the video server using the data stored at the step 730. It should be remembered that the server may store client data from multiple clients, and that the client data is associated with the particular content (and the particular time in the content) which was being viewed when the client data was acquired.

Referring to FIG. 11, the step 730 is followed by the server periodically (or at some other set of one or more instances) retrieving the client data at a step 740, and a step 750 processing the raw client data (where "raw" implies the client data in the form as received from the client) into "useful" data, where the nature of the so-called useful data will be discussed further below. At a step 760 the useful data is saved back to the tracking data store 670.

Figure 12:
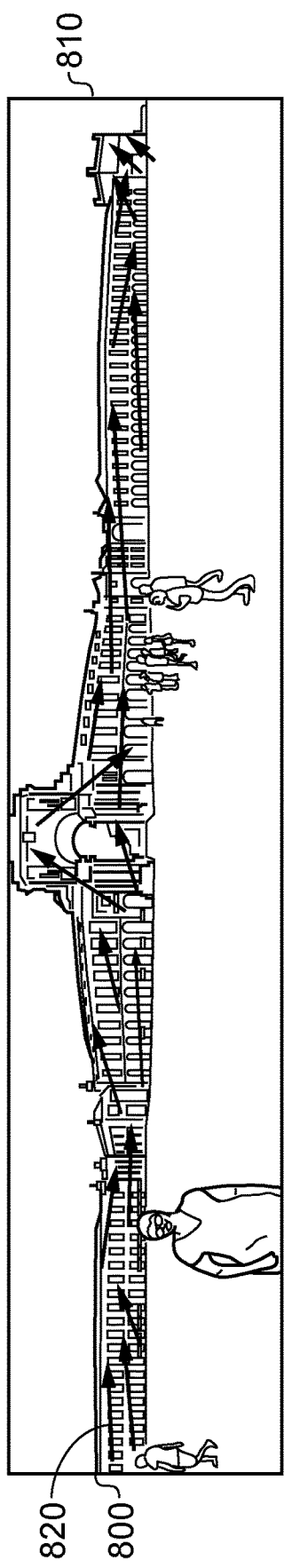
FIGS. 12 to 14 are schematic representations of video material.
Figure 13:
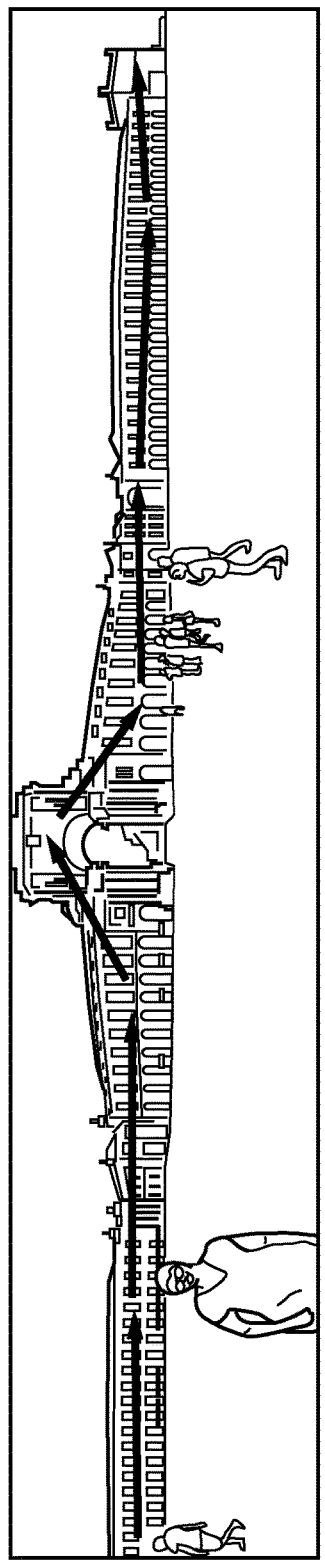
Figure 14:
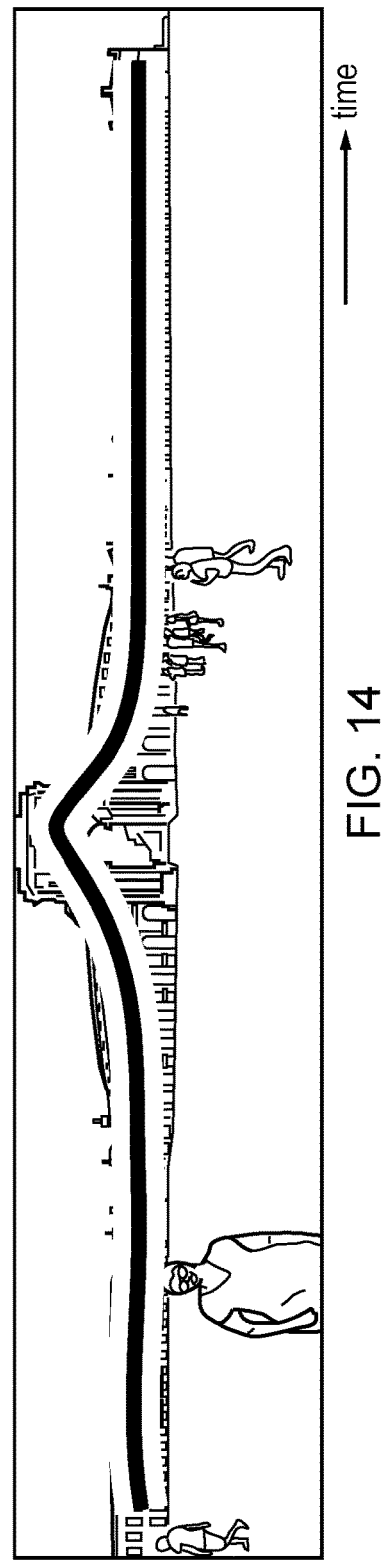

FIGS. 12 to 14 are schematic representations of video material. Because of the limitations of trying to represent two-dimensional video material which changes over time on a printed page, a single static image is used and the assumption is made, purely for the purposes of this description, that the video content remains the same over the period in question. In reality, the image would change over that period but this cannot be adequately represented on the printed page. The example image is a 360 degree panoramic image such that image content at an extreme left edge 800 of the image of FIG. 12 abuts image content at an extreme right edge 810 of the image to form a complete 360 degree image in the equatorial plane around the HMD wearer. The HMD wearer can view any portion of the image by turning his head in the manner discussed with reference to FIG. 5.

Time is represented along a horizontal axis. The representation of time refers to the position tracking information to be discussed below rather than to a progression across the image itself.

FIG. 12 schematically shows various tracks 820 relating to the position and orientation of the HMD wearer's head (carrying the HMD client) relative to the orientation of the video content, at different points in time.

One way to acquire or generate so-called useful data from this variety of tracking information is to generate an average position at each point in time, using established averaging techniques. This gives rise to an average track 830 shown in FIG. 13. Note that each time a set of client data is received from an HMD client showing this particular content, this can be included within the average and the average can be adjusted as appropriate.

An alternative method of generating useful data from the variety of tracking information is to produce a so-called "heat map" of the type shown schematically in FIG. 14. This reflects the popularity or frequency of occurrence of viewing at each position, such that in the shaded portion 840, a darker colour indicates a more frequently occurring or more popular viewing angle or position against time.

These functions can be carried out by the processor of the server, acting as an example of a track data detector to detect the track data from client data received from one or more client devices indicating regions of the panoramic video content viewed at that client device. The averaging and/or heat map techniques are examples of the track data detector being configured to aggregate information from multiple instances of the client data.

Accordingly, in these examples, either the averaged data or the heat map data can be considered as the "useful data" derived from instances of the client data. Note that useful data is derived in respect of a particular item of video content, and has a time dependency within the video content.

Note that there may in fact be multiple possible tracks (sets of data indicating user head orientation) with respect to time in the video content. For example, the scene or action in the video content may bifurcate at a particular point so that viewers may choose to watch the ongoing progress of one character or another character, where the characters are moving in different directions so that the viewer's head orientation is different (at the same time point in the video content) depending on which character the viewer chose to follow. Often, in the original production of panoramic (such as 360 degree) video content, the viewer will be gently or even unsubtly guided as to where the viewer is expected to look, for example by a concentration of action in a particular viewing direction and/or by the perceived direction of audio content in a 3D audio field (so that the viewer instinctively turns his head towards the direction of the main or most interesting sound). But where there are multiple possibilities, these can be recognised by eth video server 510 by the creation of multiple tracks. This is an example of the track data indicating a current preferred viewing region at multiple respective temporal positions within the panoramic video content.

Note that although in the present examples, the tracks or multiple tracks are defined by a detection of viewer behaviour using the client data, in other examples, at least some tracks may be pre-defined by (for example) the video content producer, and/or by a machine detection (at the step 820) of POIs in the video content.

Where there are multiple tracks, these can have portions in common, such that the video server can, for example, recognise one track for a particular time period within the video content, bifurcating into two (or more) tracks at a particular point in the video content (referred to as a key frame), and possibly recombining into a single or a lower number of tracks at a later point in the video content, and so on. The multiple tracks can be recognised by detecting two or more localised groups of client data (at the step 750) representing statistically distinguishable groupings of client data. In these examples, the video encoder is configured to encode video data representing at least some of the panoramic video content according to two or more different instances of track data; and the video encoder is configured to provide metadata to a client device indicating, for each instance of the encoded video data, the respective track data applicable to that instance of the encoded video data.

Figure 15:
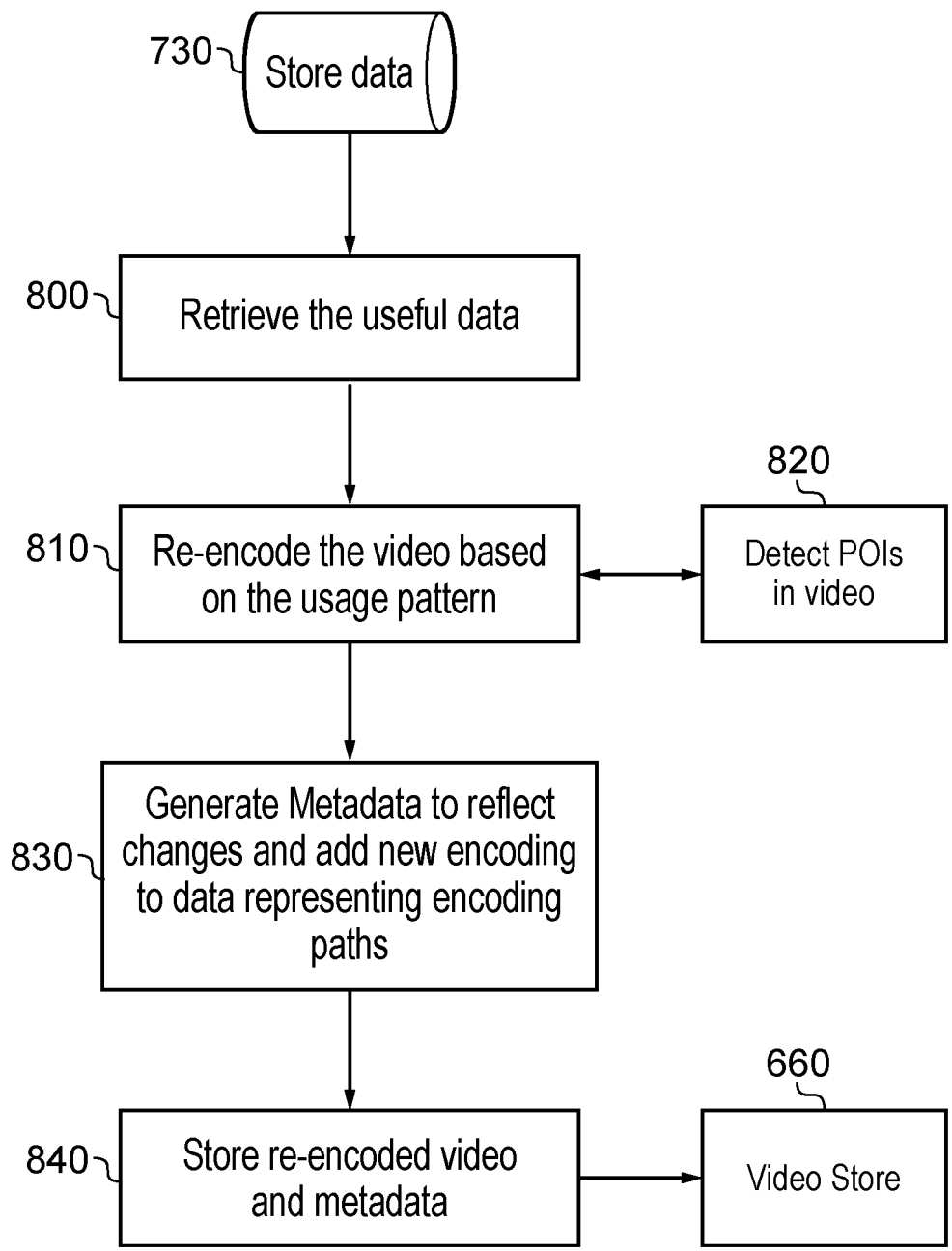
FIG. 15 is a schematic flowchart illustrating operations of a video server.

FIG. 15 is a schematic flowchart illustrating operations of the video server making use of the so-called useful data against time. The flowchart follows from the step 730 of FIG. 11, and a step 800, the server retrieves the useful data from the tracking data store 670.

At a step 810, the server encodes (or re-encodes) the video content on the basis of the usage pattern indicated by the data retrieved at the step 800. In doing so, the server may detect (or use data indicating the position of) so-called points of interest (POIs) in the video content detected at a step 820. In general terms, the server encodes the video content so as to provide a better encoding quality at regions in which the user is likely to be looking at, and/or POIs in the video content, with a lower quality elsewhere. The POIs can be detected at the step 820 using automated techniques such as face recognition with respect to the video content (which techniques need be performed only once) and/or user-based techniques such as by detecting the viewers' direction of gaze with respect to the video content, using eye tracking information sent to the server as part of the client data.

Further details of the nature of the encoding will be discussed below.

At a step 840, the encoded (or re-encoded) video content and the metadata are stored, for example in the video store 660.

More generally, the video and metadata can be provided to a so-called content delivery network (CDN). Such a network can deliver content to multiple client devices and would comprise (or replicate at least some of the functionality of) the video store 660. It will therefore be understood that the video store 660 does not necessarily need to be part of the same server as the server which does the encoding, in that in principle one server could handle the client data received from HMD clients and encode the video accordingly, and another server could provide the delivery function (of a CDN or other system) to deliver the encoded data to clients. For the purposes of the present description they are treated as a single server, but an association or network of two or more servers could be used in an equivalent manner.

Figure 16:
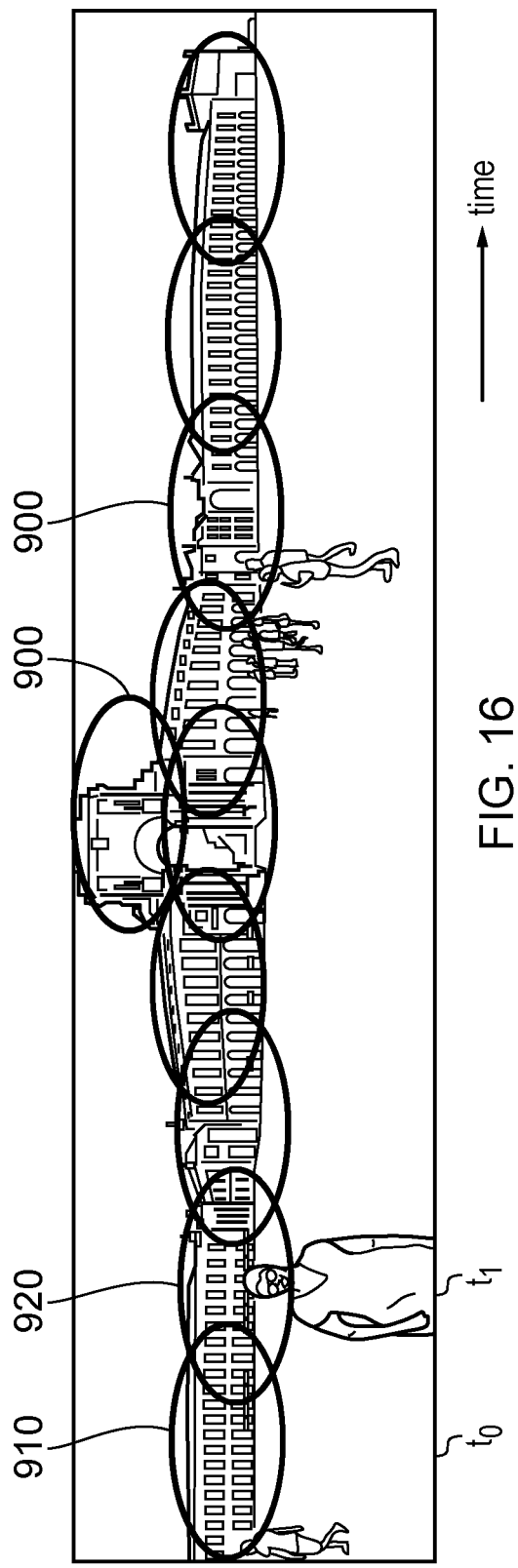
FIG. 16 schematically illustrates the encoding of video material.

FIG. 16 schematically illustrates the encoding of video material and is based upon the same example image indicative of panoramic video content used in the earlier description. Here, from the useful data derived from the client head-tracking data, various regions 900 are identified at different times within the display of the video content. For example, a particular region 910 has been identified as being a commonly viewed portion of the video content during a first time period around a time $t_0$. A second region 920 has been identified as commonly viewed around a second time period surrounding a time $t_1$ and so on. The identified regions are encoded at a generally higher encoding quality than the surrounding non-identified regions at any particular time period.

Figure 17:
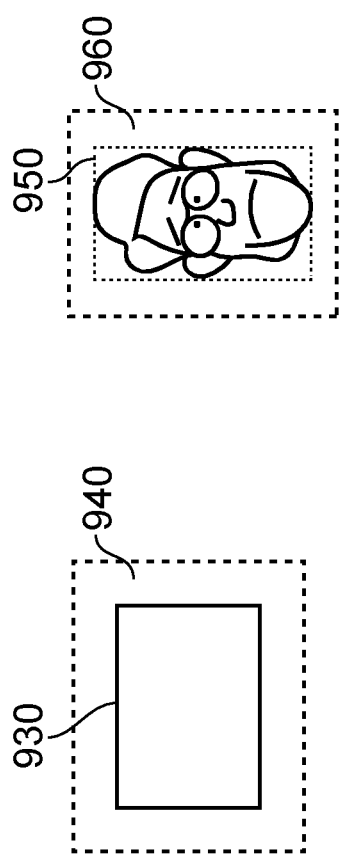

FIG. 17 schematically illustrates encoding parameters as applied to a region (being, or incorporating, an identified region such as identified region 900 in FIG. 16), in this example a rectangular region 930. Here, the region 930 is encoded at a higher encoding quality than other non-viewed (or non-commonly viewed) regions of the video content. Also a margin or surrounding region 940 is encoded at either the same high quality or at least a quality higher than the non-commonly viewed portions, so that if the viewer is looking generally at the identified region but is not exactly aligned with it, the viewer does not experience an abrupt transition between high quality and lower quality video content.

Figure 18:
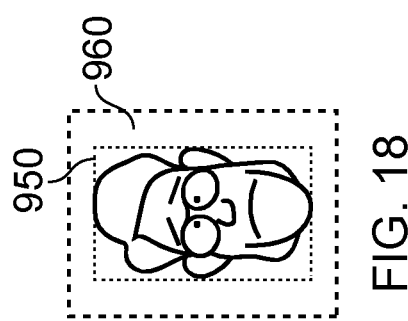
FIGS. 17 and 18 schematically illustrate encoding parameters applied to a region.

In FIG. 18, a face has been identified in the video content at the step 820 of FIG. 15, and a high quality region 950 has been assigned surrounding the identified face. Again, a margin region 960 is provided with the aim of avoiding an abrupt transition between high quality and surrounding low quality content.

The video encoding process will now be described in more detail.

The present examples can make use of techniques similar to those defined for so-called MPEG-DASH (Dynamic Adaptive Streaming over HTTP) systems.

In such systems, the HMD client and server cooperate so as to aim to provide uninterrupted content streaming at a best possible quality given the ongoing limitations of the data connection between the client and server. In examples, this is handled by treating the streaming video content as successive file segments. Each segment corresponds to a portion of time in the video content, and for each such portion of time the server holds multiple versions of the file segments each compressed to a different data quantity. So, as each segment is streamed and replayed, the occupancy of a buffer at the HMD client is monitored by the client. The client selects and requests a next segment according to the data connection performance. If the buffer occupancy is too low, the client requests a next segment having a smaller file segment size (a greater compression) than a previous segment. If the buffer occupancy is too high, the client can request a next segment at a lower compression (a greater file size). In this way the client adaptively varies the choice of file segments which it obtains from the server according to the data connection performance, so as to aim to select a combination of segments which have the highest quality (highest data rate, lowest compression) that can be obtained from the server to achieve uninterrupted replay.

The set of segments available to the client is defined by so-called manifest metadata sent from the server to the client.

In the present examples, the manifest metadata can define not only a set of segments representing different data rates, but also multiple sets of segments defining (where such tracks have been detected) multiple tracks of viewer orientation through the video content. This can provide an example of the video encoder being configured to encode video data representing at least some of the panoramic video content according to two or more different data bandwidth constraints; and the video encoder being configured to provide metadata to a client device indicating, for each instance of the encoded video data, the data bandwidth constraint applicable to that instance of the encoded video data.

The manifest metadata for a single track can define coding parameters and bandwidth requirements for each file segment.

Where there are multiple tracks, the manifest metadata can define not only coding parameters and bandwidth requirements for each file segment, but also parameters which can assist the HMD client to choose the most appropriate track according to the current orientation (and, in examples, the current direction and/or velocity of motion) or the HMD relative to the video content.

This is an example of manifest metadata relating to one instance of coding parameters and one instance of an orientation track:

<Representation id="MainPathHigh" codecs="avc1" mimeType="video/mp4" width="320" height="240" bandwidth="96986">
  <SegmentBase>
    <Initialization sourceURL="main/pano100/1.m4s" range="0-862"/>
  </SegmentBase>
  <SegmentList duration="5">
    <SegmentURL media="main/pano100/2a.m4s" mediaRange="863-7113" position="18400" direction="180" velocity="10" startWithSAP="1"/>
    <SegmentURL media="main/pano100/3a.m4s" mediaRange="7114-14104" position="19400" direction="180" velocity="10" startWithSAP="1"/>
    <SegmentURL media="main/pano100/4a.m4s" mediaRange="14105-17990" position="10400" direction="180" velocity="10" startWithSAP="1"/>

Different data fields in the manifest metadata may be identified, for example, by extended mark-up language (XML) tags.

The "representation id" identifies the track and is followed on the same line by information defining coding parameters and bandwidth.

The duration of each file segment is shown as 5 seconds. Three file segments are defined by respective URLs (universal resource locators, or in other words addresses), giving the orientation and velocity of the HMD expected at those segments.

The manifest metadata is generated at the server by the metadata generator 680. The HMD client can receive the manifest metadata, for example at the start of the streaming process (covering the entire streaming content) or at instances within the streaming of the content such that manifest metadata relating to a next period of streamed content is delivered before it is needed for controlling streaming of the content. The HMD client selects a next file segment to be sent by the server on the basis of: (a) available data link performance, as in an established DASH system, and (b) matching a track defined by the manifest metadata (where multiple tracks are defined) as a best fit to the current orientation and/or direction or velocity of motion of the HMD relative to the video content. As an example of detecting a best fit, at a key frame or segment (or at another segment) where multiple track options are first provided, the lowest difference between the current HMD orientation and velocity and those defined by the tracks can be detected. A weighted detection can be used, so that the two differences (an orientation difference and a velocity difference) can be given different respective weights before the comparison is made to detect the best fit.

Note that the present techniques can operate in respect of a single track, and can still achieve efficient bandwidth usage in respect of at least many or most users. The present techniques can operate in respect of multiple tracks but a single overall bandwidth and can still achieve advantages in respect of better using the available bandwidth for particular users and their respective HMD orientations. But in other examples, both features are used so that multiple tracks are available (where the content and viewer behaviour make these appropriate) and multiple bandwidths are available.

Note that the manifest metadata defines whichever tracks are available at a particular time position with respect to the video content. The HMD client can be constrained, once it has selected a particular track, from abruptly selecting a different track (for example, only being allowed to switch to a track at a key frame or segment, and staying on a current track until the tracks recombine at another key frame or segment).

The encoding or recoding can be performed by repeating an encoding process on the video content (or segments of the video content) based on a new track (and newly defined regions for encoding at a higher quality than other regions). Or the encoding can comprise selecting from previously encoded data representing different spatial portions of the video content at different encoding qualities.

Figure 19:
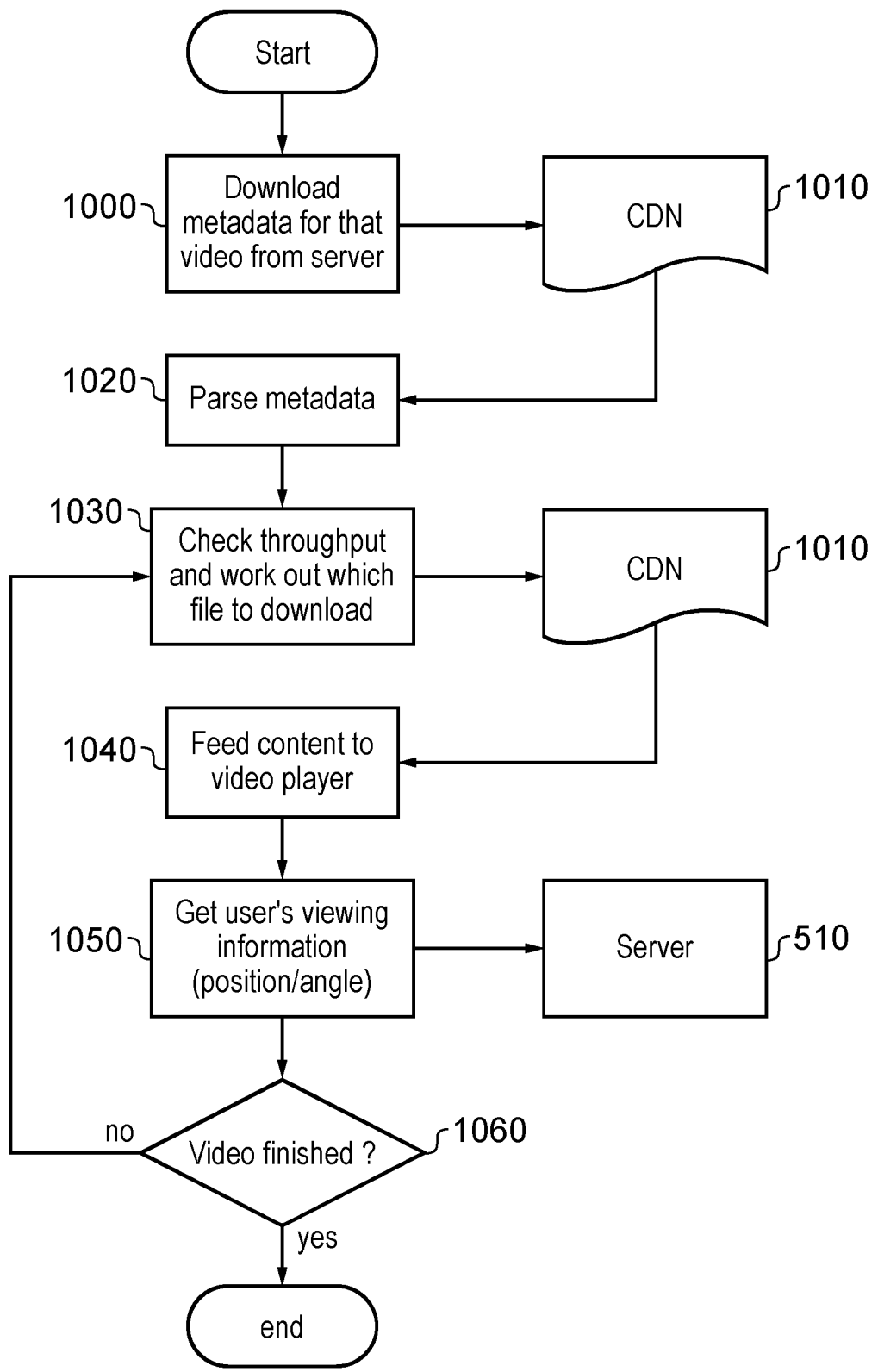
FIG. 19 is a schematic flowchart illustrating operations of an HMD client.

FIG. 19 is a schematic flowchart illustrating operations of an HMD client.

At a step 1000, the HMD client downloads or otherwise receives manifest metadata corresponding to a piece of video content to be viewed from the server 510 (for example, acting as a content delivery network or CDN 1010). As discussed above, the manifest metadata can be obtained all at once, as a single operation at or before the start of streaming, or piecemeal in portions during the streaming process.

At a step 1020 the HMD client parses the manifest metadata. This involves detecting different data fields in the manifest metadata, for example according to their XML tags.

At a step 1030 the HMD clients checks the throughout or data transfer rate and the sensor data acquired by the sensor(s) 630 to detect the current orientation and/or the direction or velocity of HMD motion. From this information, the HMD client selects which video file to download as the next segment in the manner discussed above, and requests or downloads the appropriate file from the CDN 1010. In this example, the video processor is configured to select, amongst a set of two or more representations of at least some of the panoramic video content, a representation according to a comparison of the detected orientation and metadata associated with the two or more representations. For example, the video processor may be is configured to select, amongst the set of two or more representations of the panoramic video content, a representation according to a comparison of a rate of change of the detected orientation and metadata associated with the two or more representations. In examples, the two or more representations comprise encoded video data representing panoramic video content in which the panoramic video content has a greater field of view than a displayable region at the HMD, spatial regions within the video content being encoded at different respective encoding qualities in dependence upon track data indicating, for temporal positions with respect to the panoramic video content, a preferred viewing region within the panoramic video content at those temporal positions, so that the preferred viewing region is encoded at a higher encoding quality than another region of the panoramic video content. The metadata may be indicative of the track data. The encoded video data may represent the panoramic video content according to two or more different instances of track data; and the metadata indicates, for each instance of the encoded video data, the respective track data applicable to that instance of the encoded video data.

As an alternative, or in addition, the HMD client can detect demographic or usage data about the current wearer of the HMD, for example with respect to login or other user information supplied by and/or detected from the wearer. Examples of such data can include head position, velocity, age, gender, location, time of day, head movement such as rapid movement or taking the headset off, headset volume and so, but other examples are possible. This information is sent to the server as part of the client data and is associated, by the server (on an aggregated basis as discussed above) with the track data and the manifest metadata. Where multiple tracks are provided, the HMD client can use the current data detected from the current wearer, in comparison with the manifest metadata, as at least a part of an overall comparison (such as a weighted comparison) to select an appropriate track for the current wearer under the current circumstances.

At a step 1040, the downloaded file is provided to the video display arrangement 600.

At a step 1050, the HMD client acquires information relating to the viewing position and/or angle. This is sent to the server 510 for processing as discussed above and is also used in the step 1030.

If, at a step 1060, the video content is finished then the processor ends. Otherwise control returns to the step 1030.

FIGS. 20*a*-20*c* schematically illustrate an example video encoding a display technique.

Assume, as shown in FIG. 20*a*, that the HMD client 500 is currently viewing a region 1100 within a (truncated) panoramic image 1110. The image is actually transmitted to the HMD 500 as so-called texture data as used in computer game image generation. The texture data is accompanied by a so-called resolution map 1120 as shown in FIG. 20*b*. The resolution map contains numerical values in this example, each indicative of a ratio of the display resolution to the textured resolution of the texture data as supplied by the server 510. So, a value of 1 indicates a 1,1 ratio between the resolution of the texture data and the resolution at which it is to be displayed. In other words, this represents texture data at the highest displayable resolution. A value of 2 in the resolution map indicates that the special resolution of the texture data is half (in each direction) that of the display resolution, so that each texture value has to be used multiple times (four times in this example) in the displayed version.

FIG. 20*c* schematically shows the resolution map superposed over the image material.

In these example coding systems (and corresponding decoding at the HMD client) the video encoder is configured to encode the panoramic video content as successive instances of an image texture, and interpolation data indicating a degree of interpolation to be applied to respective areas of the image texture.

The server 510 can be arranged to perform a video encoding method comprising encoding video data representing panoramic video content in which the panoramic video content has a greater field of view than a displayable region at a client device, the encoding step comprising encoding spatial regions within the video content at different respective encoding qualities in dependence upon track data indicating, for temporal positions with respect to the panoramic video content, a preferred viewing region within the panoramic video content at those temporal positions, so that the preferred viewing region is encoded at a higher encoding quality than another region of the panoramic video content.

The HMD client 500 can be arranged to perform a method of operation of a head mountable display (HMD) comprising: detecting an orientation of the HMD; and generating images for display by the display arrangement in dependence upon the detected current orientation, from panoramic video content sent to the HMD by a video server; and selecting, amongst a set of two or more representations of the panoramic video content, according to a comparison of the detected orientation and metadata associated with the two or more representations.

As discussed above, these methods can be carried out by the respective processor operating using computer software which, when executed by a computer, causes the computer to carry out the above methods. Such computer software may be provided by a non-transitory machine-readable storage medium.

In terms of the signals sent between the server and the HMD client, example embodiments include a video signal representing panoramic video content in which the panoramic video content has a greater field of view than a displayable region at a client device, spatial regions within the video content being encoded at different respective encoding qualities in dependence upon track data indicating, for temporal positions with respect to the panoramic video content, a preferred viewing region within the panoramic video content at those temporal positions. The signal may comprise metadata defining the track data applicable to the encoded video content. The signal may comprise two or more instances of encoded video data relating to the same portion of panoramic video content but different respective track data; and two or more respective instances of metadata.

It will be apparent that numerous modifications and variations of the present disclosure are possible in light of the above teachings. It is therefore to be understood that within the scope of the appended claims, the disclosure may be practised otherwise than as specifically described herein.

The invention claimed is:

1. A head mountable display (HMD) system, comprising:
   a video server having a video encoder to encode video data representing panoramic video content in which the panoramic video content has a greater field of view than a displayable region at a client device, wherein the video encoder is configured to encode spatial regions within the video content at different respective encoding qualities in dependence upon track data indicating, for temporal positions with respect to the panoramic video content, a preferred viewing region within the panoramic video content at those temporal positions, so that the preferred viewing region is encoded at a higher encoding quality than another region of the panoramic video content; and an HMD, configured to act as a client of the video server, the HMD comprising:
a display arrangement;
an orientation detector configured to detect an orientation of the HMD; and
a video processor configured to generate images for display by the display arrangement in dependence upon the detected current orientation, from panoramic video content sent to the HMD by the video server, wherein the video processor is configured to select, amongst a set of two or more representations of at least some of the panoramic video content, a representation according to a comparison of the detected orientation and metadata associated with the two or more representations.

2. The HMD system according to claim 1, wherein the track data indicates a current preferred viewing region at multiple respective temporal positions within the panoramic video content.

3. The HMD system according to claim 1, comprising a track data detector to detect the track data from client data received from one or more client devices indicating regions of the panoramic video content viewed at that client device.

4. The HMD system according to claim 3, wherein the track data detector is configured to aggregate information from multiple instances of the client data.

5. The HMD system according to claim 1, wherein:
the video encoder is configured to encode video data representing at least some of the panoramic video content according to two or more different instances of track data; and
the video encoder is configured to provide metadata to a client device indicating, for each instance of the encoded video data, the respective track data applicable to that instance of the encoded video data.

6. The HMD system according to claim 1, wherein:
the video encoder is configured to encode video data representing at least some of the panoramic video content according to two or more different data bandwidth constraints; and
the video encoder is configured to provide metadata to a client device indicating, for each instance of the encoded video data, the data bandwidth constraint applicable to that instance of the encoded video data.

7. The HMD system according to claim 1, wherein the video encoder is configured to encode the panoramic video content as successive instances of an image texture, and interpolation data indicating a degree of interpolation to be applied to respective areas of the image texture.

8. The HMD system according to claim 1, comprising a data transmitter to transmit at least encoded video data to one or more client devices.

9. The HMD system according to claim 1, wherein the video server is configured to associate demographic or usage data about the current wearer of the HMD with the track data.

10. The HMD system according to claim 1, in which the video processor is configured to select, amongst the set of two or more representations of the panoramic video content, a representation according to a comparison of a rate of change of the detected orientation and metadata associated with the two or more representations.

11. The HMD system according to claim 1, wherein the two or more representations comprise encoded video data representing panoramic video content in which the panoramic video content has a greater field of view than a displayable region at the HMD, spatial regions within the video content being encoded at different respective encoding qualities in dependence upon track data indicating, for temporal positions with respect to the panoramic video content, a preferred viewing region within the panoramic video content at those temporal positions, so that the preferred viewing region is encoded at a higher encoding quality than another region of the panoramic video content.

12. The HMD system according to claim 11, wherein the metadata is indicative of the track data.

13. The HMD system according to claim 12, wherein the encoded video data represents the panoramic video content according to two or more different instances of track data; and
the metadata indicates, for each instance of the encoded video data, the respective track data applicable to that instance of the encoded video data.

14. The HMD system according to claim 13, comprising a client data transmitter to send data indicative of the detected orientation to the video server.

15. The HMD system according to claim 13, wherein:
the HMD client is configured to detect demographic or usage data about the current wearer of the HMD;
the metadata indicates, for each instance of the encoded video data, demographic or usage data applicable to that instance of the encoded video data; and
the HMD is configured to compare the detected demographic or usage data with the demographic or usage data indicated by the metadata.

16. The HMD system according to claim 1, wherein:
the encoded video data represents the panoramic video content according to two or more different data bandwidth constraints; and
the metadata indicates, for each instance of the encoded video data, the data bandwidth constraint applicable to that instance of the encoded video data.

17. The HMD system according to claim 1, wherein:
the encoded video data represents the panoramic video content as successive instances of an image texture, and interpolation data indicating a degree of interpolation to be applied to respective areas of the image texture.

18. A video encoding method comprising:
encoding, at a video server, video data representing panoramic video content in which the panoramic video content has a greater field of view than a displayable region at a client device, the encoding step comprising encoding spatial regions within the video content at different respective encoding qualities in dependence upon track data indicating, for temporal positions with respect to the panoramic video content, a preferred viewing region within the panoramic video content at those temporal positions, so that the preferred viewing region is encoded at a higher encoding quality than another region of the panoramic video content:,
detecting an orientation of a head mounted display (HMD); and
generating images for display by a display arrangement in dependence upon the detected current orientation, from panoramic video content sent to the HMD by the video server; and
selecting, amongst a set of two or more representations of at least some of the panoramic video content, a representation according to a comparison of the detected orientation and metadata associated with the two or more representations.

19. The method according to claim 18, wherein the signal comprising metadata defining the track data applicable to the encoded video content.

20. The method according to claim 19, wherein the video data includes:
- two or more instances of encoded video data relating to the same portion of panoramic video content but different respective track data; and
- two or more respective instances of metadata.

21. A non-transitory, computer readable storage medium containing a computer program which, when executed by a computer, causes the computer to carry out actions, comprising:
- encoding, at a video server, video data representing panoramic video content in which the panoramic video content has a greater field of view than a displayable region at a client device, the encoding step comprising encoding spatial regions within the video content at different respective encoding qualities in dependence upon track data indicating, for temporal positions with respect to the panoramic video content, a preferred viewing region within the panoramic video content at those temporal positions, so that the preferred viewing region is encoded at a higher encoding quality than another region of the panoramic video content;
- detecting an orientation of a head mountable display (HMD);
- generating images for display by a display arrangement in dependence upon the detected current orientation, from panoramic video content sent to the HMD by the video server; and
- selecting, amongst a set of two or more representations of the panoramic video content, according to a comparison of the detected orientation and metadata associated with the two or more representations.

* * * * *